(12) United States Patent
Ishida et al.

(10) Patent No.: US 8,407,940 B2
(45) Date of Patent: Apr. 2, 2013

(54) VEHICLE DOOR DRIVING APPARATUS

(75) Inventors: Toshihiko Ishida, Niwa-gun (JP);
Masayoshi Yasuhara, Okazaki (JP)

(73) Assignee: Aisin Seiki Kabushiki Kaisha,
Kariya-Shi, Aichi-Ken (JP)

( * ) Notice: Subject to any disclaimer, the term of this patent is extended or adjusted under 35 U.S.C. 154(b) by 0 days.

(21) Appl. No.: 13/503,834

(22) PCT Filed: Nov. 15, 2010

(86) PCT No.: PCT/JP2010/070312
§ 371 (c)(1),
(2), (4) Date: Apr. 24, 2012

(87) PCT Pub. No.: WO2011/062144
PCT Pub. Date: May 26, 2011

(65) Prior Publication Data
US 2012/0204663 A1 Aug. 16, 2012

(30) Foreign Application Priority Data
Nov. 17, 2009 (JP) ................................. 2009-262291

(51) Int. Cl.
*F16H 29/02* (2006.01)
*F16H 27/02* (2006.01)
*E05F 11/48* (2006.01)
*E05F 11/00* (2006.01)

(52) U.S. Cl. ................................. 49/352; 74/89; 49/360

(58) Field of Classification Search ........... 74/89, 89.16, 74/89.2, 434, 438, 457; 475/154, 149, 311, 475/312; 49/348, 349, 352, 360
See application file for complete search history.

(56) References Cited

U.S. PATENT DOCUMENTS
(Continued)

FOREIGN PATENT DOCUMENTS
JP 2003-082927 A 3/2003
JP 2006-194023 A 7/2006
(Continued)

OTHER PUBLICATIONS
International Search Report (PCT/ISA/210) issued on Jan. 18, 2011, by Japanese Patent Office as the International Searching Authority for International Application No. PCT/JP2010/070312.
(Continued)

*Primary Examiner* — Justin Krause
(74) *Attorney, Agent, or Firm* — Buchanan Ingersoll & Rooney PC

(57) ABSTRACT

A vehicle door driving apparatus includes a driving mechanism fixed to a vehicle door and including a motor and a drum rotationally driven by the motor. A rope member is wound around the drum and linked to the vehicle body, and rotation of the drum is transmitted to the vehicle body by the rope member to open and close the vehicle door. The driving mechanism includes: a first small-diameter gear linked to the rotary axis of the motor to rotate together with the rotary shaft of the motor; a transmission gear rotatable around the axis extending in the vehicle width direction; a sun gear rotatable around such axis; a ring gear disposed on the same axis as the sun gear; and a carrier having a planet gear engaging the sun gear and the ring gear, and linked to the drum so that the carrier rotates together with the drum.

5 Claims, 7 Drawing Sheets

U.S. PATENT DOCUMENTS

| | | | | |
|---|---|---|---|---|
| 6,125,586 A * | 10/2000 | Buscher | | 49/360 |
| 6,179,742 B1 | 1/2001 | Haag et al. | | |
| 6,460,295 B1 * | 10/2002 | Johnson et al. | | 49/360 |
| 6,712,727 B2 * | 3/2004 | Kujira et al. | | 475/149 |
| 2005/0150167 A1 * | 7/2005 | Yokomori | | 49/360 |
| 2006/0156630 A1 | 7/2006 | Yokomori et al. | | |
| 2007/0163179 A1 * | 7/2007 | Fukumura et al. | | 49/360 |
| 2008/0053781 A1 | 3/2008 | Kita | | |
| 2009/0019773 A1 | 1/2009 | Gruhn et al. | | |
| 2009/0107048 A1 | 4/2009 | Nagai et al. | | |

FOREIGN PATENT DOCUMENTS

| | | |
|---|---|---|
| JP | 2008-063762 A | 3/2008 |
| JP | 2009-523983 A | 6/2009 |
| WO | WO 2007/084289 A2 | 7/2007 |

OTHER PUBLICATIONS

European Search Report dated Oct. 4, 2012 issued in the corresponding European Patent Application No. 10831538.3-1267/2503088.

* cited by examiner

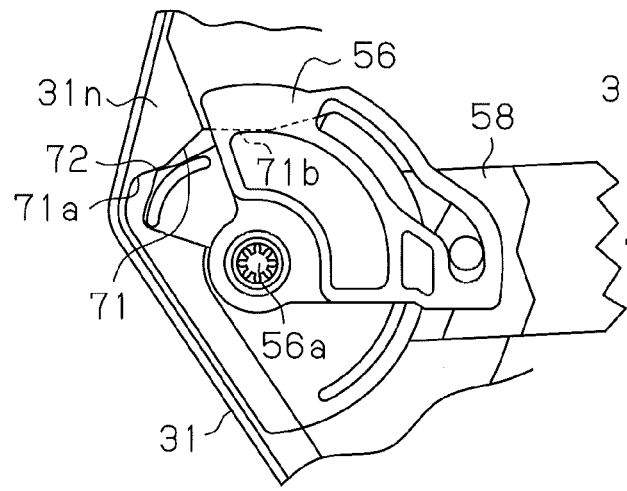
Fig.7(a)
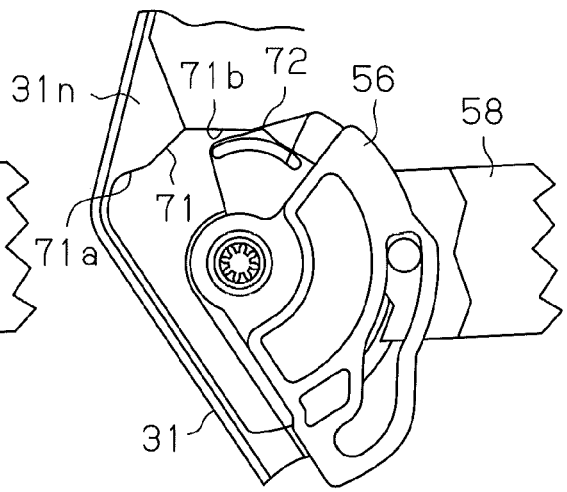
Fig.7(b)
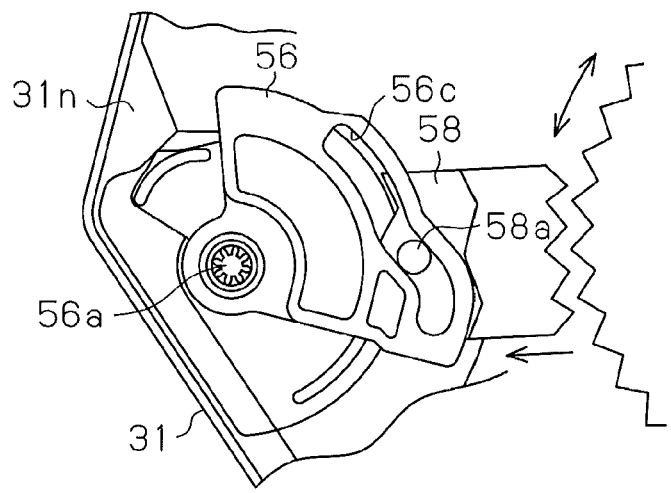
Fig.8
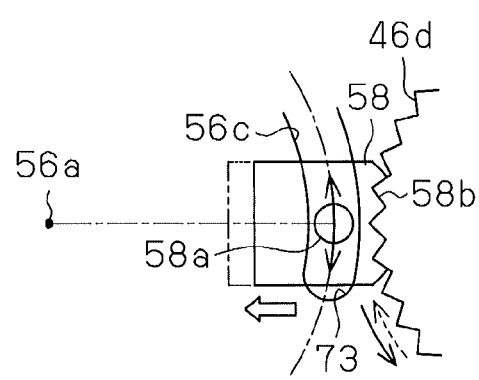

VEHICLE DOOR DRIVING APPARATUS

TECHNICAL FIELD

The present invention relates to a vehicle door driving apparatus that drives a vehicle door. The door selectively opens and closes a door opening formed in a vehicle body.

BACKGROUND ART

Conventionally, various vehicle door driving apparatuses have been proposed. For example, a vehicle door driving apparatus disclosed in Patent Document 1 includes a vehicle door movably supported by a guide rail (3), which is fixed to a vehicle body, a drive mechanism (6), which is fixed to the vehicle door, and a cable (7), which is selectively wound and fed out by the drive mechanism. The ends of the cable are respectively connected to the vehicle body at the front end and the rear end of the guide rail. Therefore, when the drive mechanism selectively winds and feeds out the cable, the vehicle door is selectively opened and closed.

Patent Document 2 discloses a drive mechanism that can be applied to such a vehicle door driving apparatus. The drive mechanism includes a planet gear mechanism as a speed reducing mechanism. The planet gear mechanism reduces the rotational speed of a motor and transmits the rotation to a drum by a speed reduction ratio in which a sun gear directly connected to the rotary shaft of the motor serves as a drive shaft. A ring gear coupled to the drum to rotate integrally with the drum serves as a driven shaft, and a carrier serves as a fixed shaft. The speed reducing mechanism is coaxial with the rotary shaft of the motor, and the projected area of the drive mechanism in the axial direction as a whole is reduced.

Patent Document 3 discloses another drive mechanism that can be applied to such a vehicle door driving apparatus. The drive mechanism includes a speed reducing mechanism, including a worm gear having a high speed reduction ratio, and an electromagnetic clutch, which connects and disconnects transmission of the rotation of the motor to the drum via the speed reducing mechanism. The outer diameter of the drum is set in accordance with the relationship between the output property of the motor in relation to the winding speed and the required torque for winding. The outer diameter of the electromagnetic clutch is set smaller than the outer diameter of the drum. In this case, since the outer diameter of the electromagnetic clutch is reduced, the size of the electromagnetic clutch in the axial direction is increased. However, the electromagnetic clutch is stored in the drum to efficiently use the space occupied by the drum. Thus, the size of the drive mechanism is prevented from being increased.

PRIOR ART DOCUMENT

Patent Document

Patent Document 1: Japanese Laid-Open Patent Publication No. 2003-82927
Patent Document 2: Japanese National Phase Laid-Open Patent Publication No. 2009-523983
Patent Document 3: Japanese Laid-Open Patent Publication No. 2008-63762

SUMMARY OF THE INVENTION

Problems that the Invention is to Solve

Since the drive mechanism of Patent Document 2 has the structure in which the motor and the speed reducing mechanism are stacked in the axial direction, the size of the drive mechanism is increased in the axial direction as a whole. It is therefore presumed that mounting the drive mechanism on the vehicle door that in particular has space limitations is difficult.

Since the drive mechanism of Patent Document 3 includes the worm gear coupled to the motor as the speed reducing mechanism, the occupied space around the rotary shaft of the motor cannot be effectively used. Since the worm wheel, the drum, and the electromagnetic clutch are stacked in the axial direction, the size of the drive mechanism as a whole in the axial direction is inevitably increased. Also, since the transmission efficiency of the worm gear is low, the size of the motor needs to be increased to achieve the required torque.

Accordingly, it is an objective of the present invention to provide a vehicle door driving apparatus that sufficiently reduces the rotational speed of a motor while increasing the flexibility in the arrangement in a vehicle door by reducing the size as a whole in the vehicle widthwise direction.

Means for Solving the Problems

To achieve the foregoing objective and in accordance with one aspect of the present invention, a vehicle door driving apparatus that includes a drive mechanism and a rope member is provided. The drive mechanism is secured inside a vehicle door. The drive mechanism opens and closes a door opening formed in a vehicle body, and includes a motor and a drum, which is rotated by the motor. The rope member is wound about the drum and coupled to the vehicle body. The vehicle door is opened and closed as rotation of the drum is converted to force applied to the vehicle body via the rope member. The drum is arranged inside the vehicle door such that the drum at least partially overlaps with a space having a dimension in the lateral direction of the vehicle defined by an outer shape of the motor. The drive mechanism includes a first small-diameter gear portion, a transmission gear, a sun gear, a ring gear, and a carrier. The first small-diameter gear portion is coupled to a rotary shaft of the motor to rotate integrally with the rotary shaft. The transmission gear is freely rotational about an axis extending in the lateral direction of the vehicle, and includes a first large-diameter gear portion, which is meshed with the first small-diameter gear portion and forms a gear pair with intersecting axes or a hypoid gear together with the first small-diameter gear portion, and a second small-diameter gear portion, which is arranged on an opposite side of the first large-diameter gear portion in the axial direction of the transmission gear. The sun gear is freely rotational about an axis extending in the lateral direction of the vehicle, and includes a second large-diameter gear portion, which is meshed with the second small-diameter gear portion, and a sun gear portion, which is arranged on the same side of the second large-diameter gear portion as the rotary shaft. The ring gear is arranged coaxially with the sun gear and radially outward of the sun gear portion, and serves as a fixed shaft. The carrier includes a planet gear meshed with the sun gear portion and the ring gear, and the carrier is coupled to the drum to rotate integrally with the drum.

BRIEF DESCRIPTION OF THE DRAWINGS

FIGS. 7(a) and 7(b) are diagrams showing operations of the switching lever of the vehicle door driving apparatus in FIG. 1;

FIG. 8 is a diagram showing operations of the cancellation mechanism of the vehicle door driving apparatus in FIG. 1;

MODES FOR CARRYING OUT THE INVENTION

One embodiment of the present invention will now be described with reference to the drawings.

Figure 1:
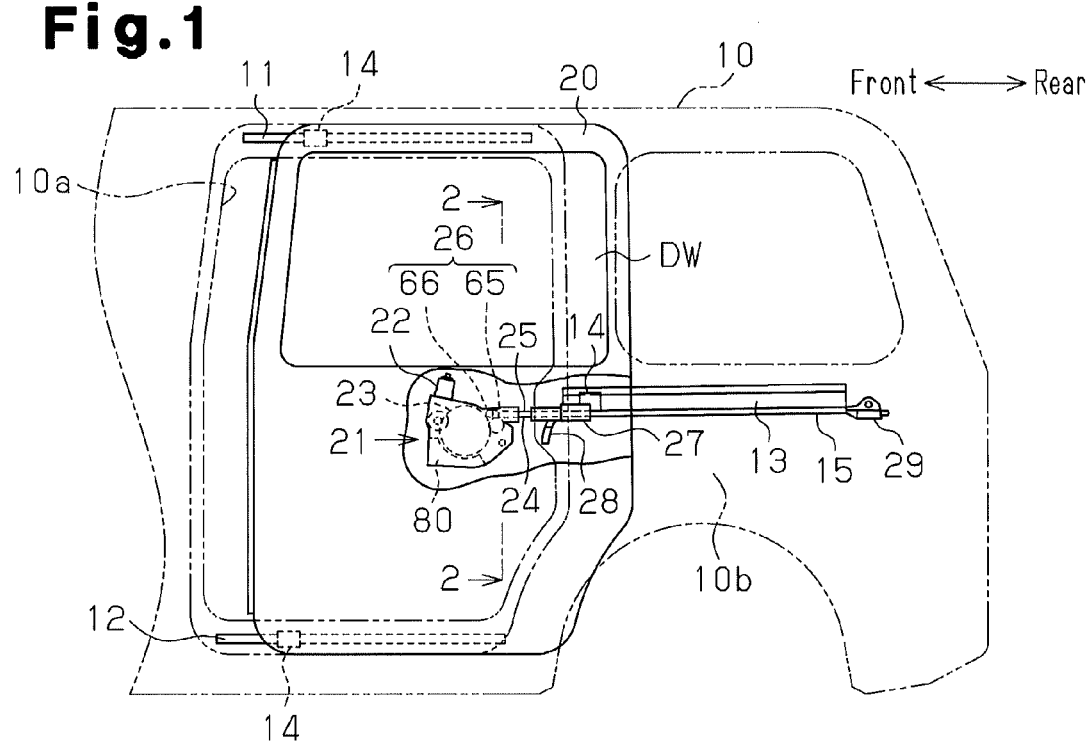
FIG. 1 is a schematic diagram illustrating a vehicle door driving apparatus according to one embodiment of the present invention.

As shown in FIG. 1, a vehicle body 10 has a door opening 10a on a side portion. An upper rail 11 and a lower rail 12 are respectively arranged along the upper edge and the lower edge of the door opening 10a. A center rail 13, which extends in the fore-and-aft direction of the vehicle, is located on a quarter panel 10b provided rearward of the door opening 10a. The rails 11, 12, 13 support a vehicle door, which is a slide door 20 in this embodiment, via guide roller units 14 to be movable in the fore-and-aft direction of the vehicle. The slide door 20 opens and closes the door opening 10a in accordance with the movement in the fore-and-aft direction of the vehicle. The center rail 13 is arranged at the height in the vicinity of a door belt line of the vehicle. A cable guide 15 is provided on the quarter panel 10b along the lower edge of the center rail 13 to extend along the entire length of the center rail 13.

Figure 2:
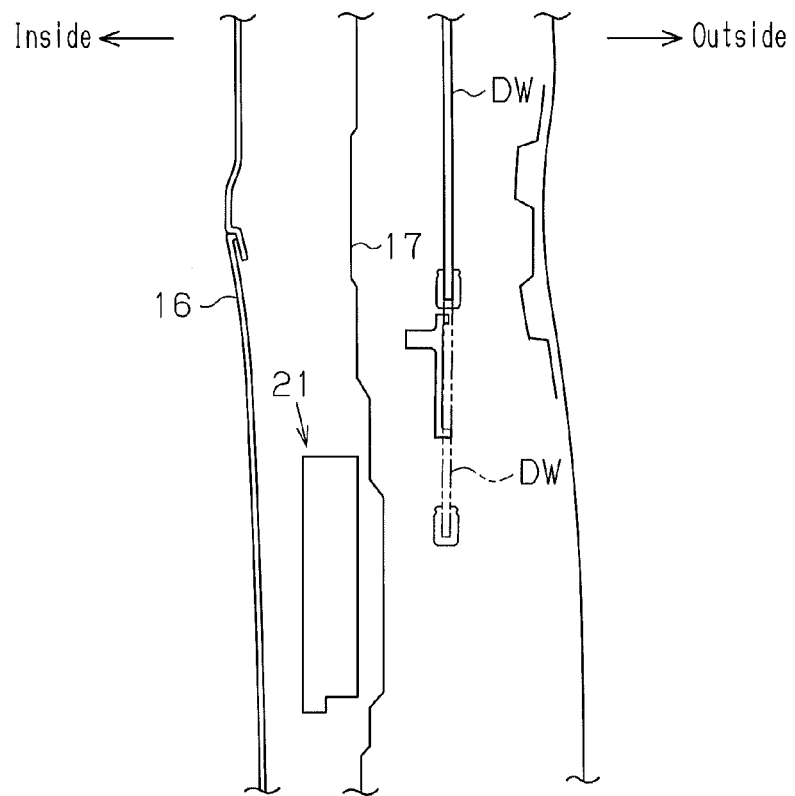
FIG. 2 is a cross-sectional view taken along line 2-2 of FIG. 1.

A drive unit 21 is secured inside and at the rear part of the slide door 20 at the height in the vicinity of the door belt line by, for example, fastening with bolts and nuts. More specifically, as shown in FIG. 2, the drive mechanism 21 is secured to a door inner panel 17 such that the drive mechanism 21 is sandwiched between a door trim 16, which forms a door inner lining of the slide door 20, and the door inner panel 17, which form a door inner plate, in the door thickness direction (vehicle widthwise direction). A door window glass DW, which is raised and lowered inside the slide door 20, is arranged outward of the door inner panel 17 (outward in the vehicle widthwise direction). That is, although the drive mechanism 21 is arranged at the height that overlaps the door window glass DW, the drive mechanism 21 does not hinder raising and lowering of the door window glass DW.

As shown in FIG. 1, the drive mechanism 21 includes a drive motor 22, which is a brush motor, and a drum 23, which is rotated by the drive motor 22. Rope members, which are a first cable 24 and a second cable 25 in this embodiment, are wound around the drum 23. That is, the first and second cables 24, 25 are wound around the drum 23 in a state in which first ends are respectively fastened to the drum 23. The first and second cables 24, 25 are selectively wound and fed out by the drive mechanism 21. Also, the drive mechanism 21 further includes a pulley mechanism, which is a middle pulley 26 in this embodiment. The first and second cables 24, 25 extend from the slide door 20 to the vehicle body 10 via the middle pulley 26 and a guide pulley 27. The guide pulley 27 is coupled to the guide roller unit 14, which moves along the center rail 13. The first and second cables 24, 25 are arranged in the fore-and-aft direction of the vehicle along the cable guide 15. The pulleys 26, 27 are respectively arranged at positions rearward of the drum 23 and further rearward at a height in the vicinity of the door belt line. The first cable 24 is guided by the cable guide 15 to extend forward and is coupled to the vehicle body 10 at the front end of the cable guide 15 via a tensioner 28, which is coupled to a second end by, for example, fastening with bolts and nuts. The second cable 25 is guided by the cable guide 15 to extend rearward and is coupled to the vehicle body 10 at the rear end of the cable guide 15 via a tensioner 29, which is coupled to a second end by, for example, fastening with bolts and nuts.

With this structure, for example, when the drive mechanism 21 winds the second cable 25 while feeding out the first cable 24, the slide door 20 moves rearward to open the door opening 10a. When the drive mechanism 21 winds the first cable 24 while feeding out the second cable 25, the slide door 20 moves forward to close the door opening 10a.

Figure 3:
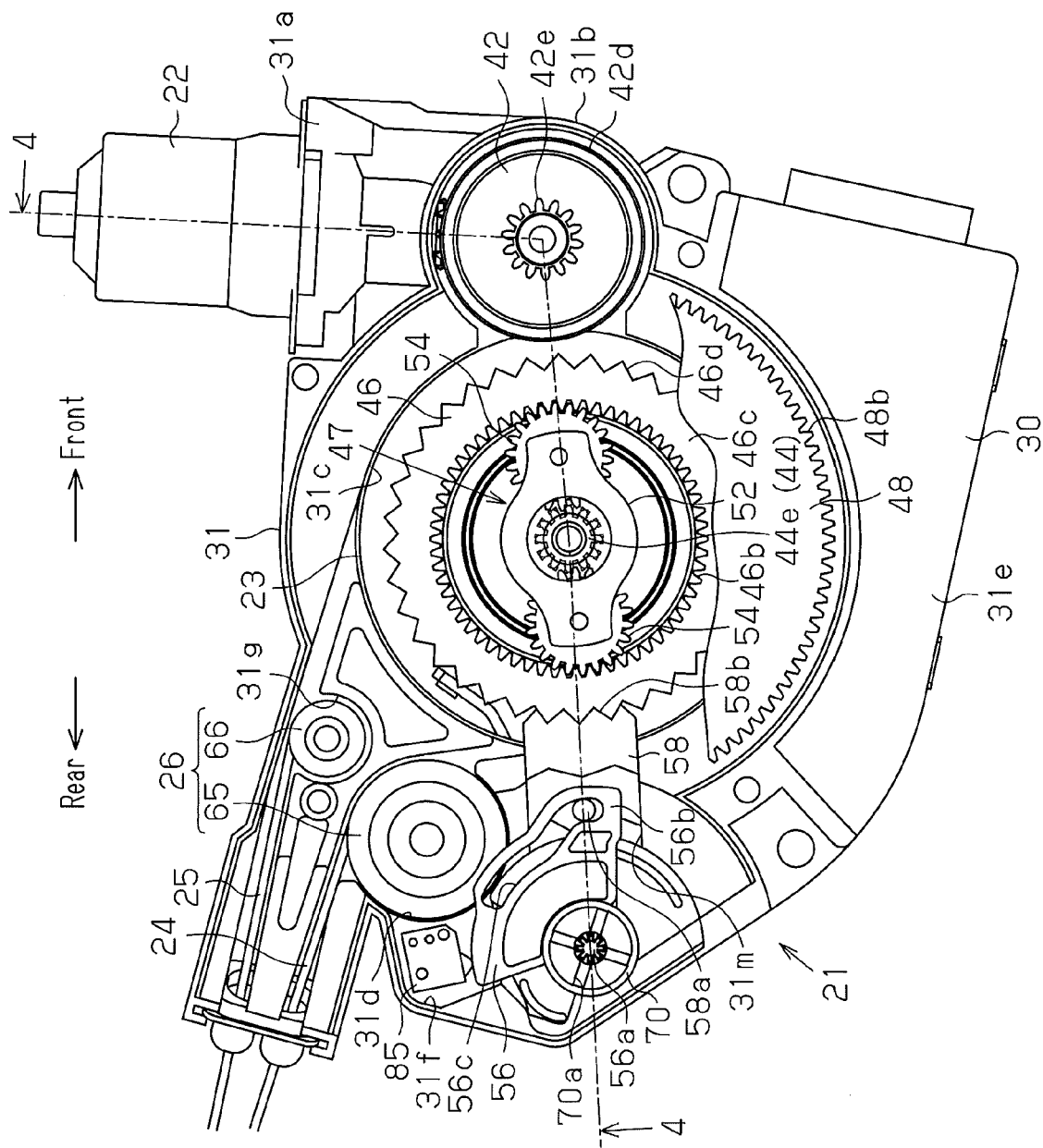
FIG. 3 is a front view illustrating the drive mechanism of the vehicle door driving apparatus of FIG. 1 as viewed from the inner side of the vehicle widthwise direction.
Figure 4:
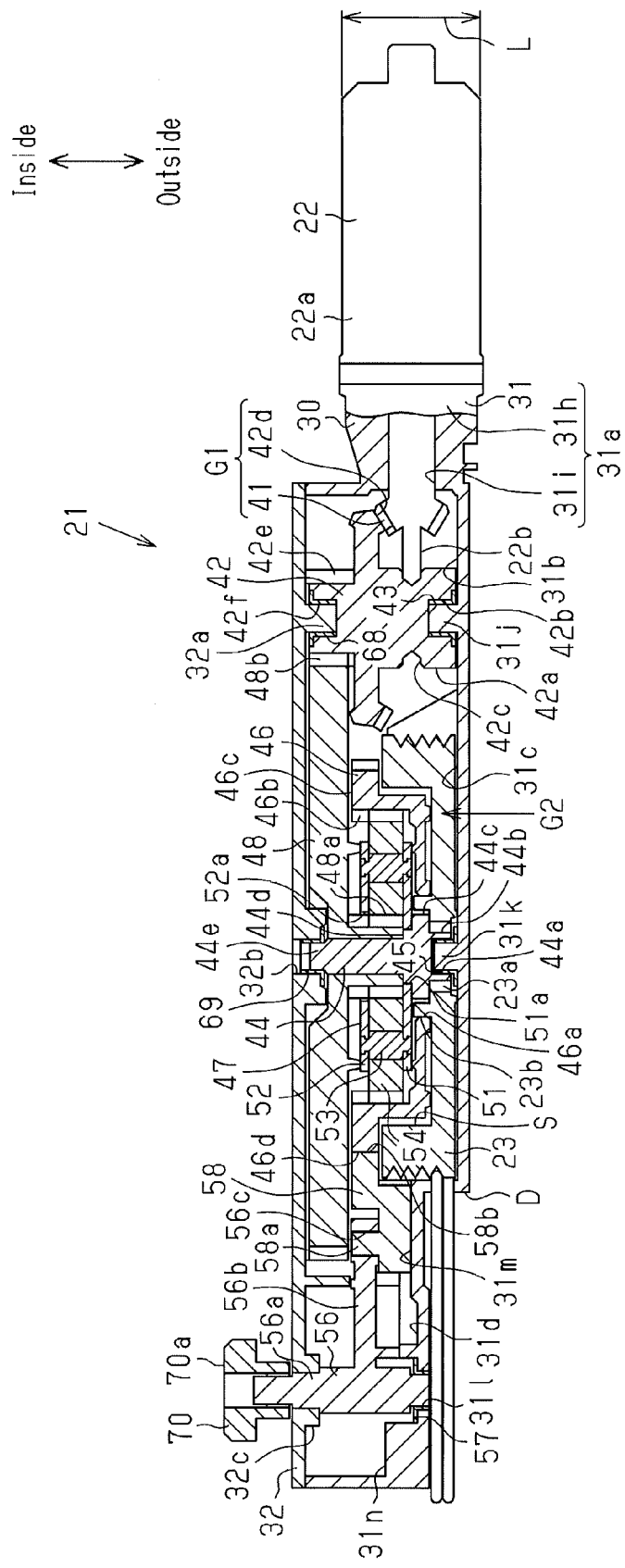
FIG. 4 is a cross-sectional view taken along line 4-4 of FIG. 3.

The structure of the drive mechanism 21 will further be described. As shown in FIGS. 3 and 4, the drive mechanism 21 includes a box-like case 30, which forms the outer shape, and accommodates and supports various types of components. The case 30 includes a housing 31, which forms an accommodating space for various types of components, and a first cover 32 and a second cover 33 (see FIG. 5), which respectively close opening portions of the housing 31 that are open in opposite directions. The drive mechanism 21 is secured to and supported by the door inner panel 17 by fastening the housing 31 to the door inner panel 17. The housing 31, the first cover 32, and the second cover 33 are formed of, for example, a plastic material.

Figure 5:
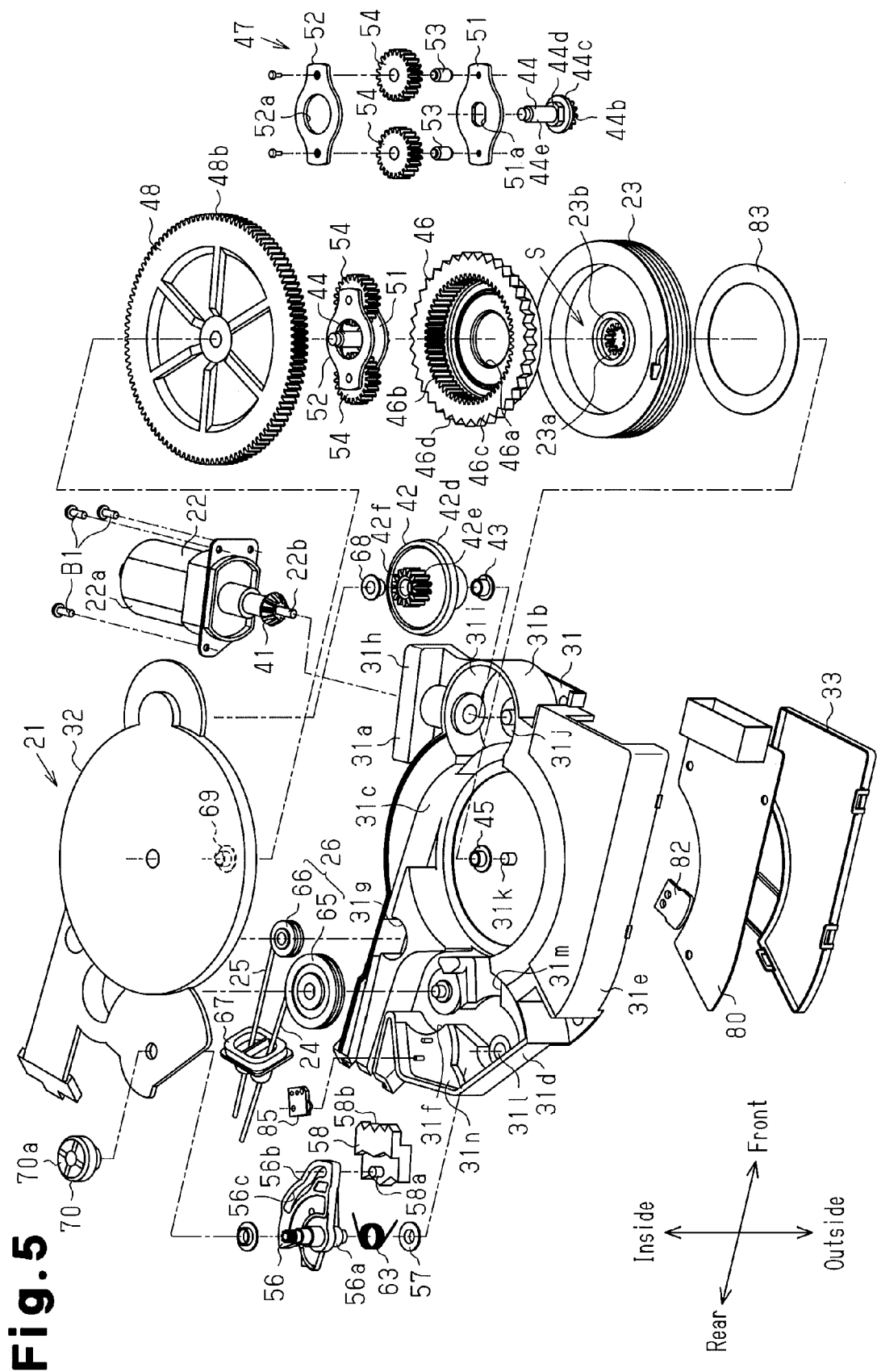
FIG. 5 is an exploded perspective view illustrating the drive unit of FIG. 3.

As shown in FIG. 5, the housing 31 integrally includes a motor holder portion 31a, which is arranged at the front upper edge, a substantially cup-shaped first gear accommodation portion 31b, which is arranged adjacent to the lower side of the motor holder portion 31a, a substantially cup-shaped second gear accommodation portion 31c, which is arranged adjacent to the rear side of the first gear accommodation portion 31b, a substantially sectorial cup-shaped lever accommodation portion 31d, which is arranged adjacent to the rear side of the second gear accommodation portion 31c, a reverse cup-shaped substrate accommodation portion 31e, which is arranged adjacent to the lower side of the second gear accommodation portion 31c in a manner to extend between the first gear accommodation portion 31b and the lever accommodation portion 31d, and a pair of pulley accommodation portions 31f, 31g, which are arranged above the lever accommodation portion 31d and in a manner to be arranged next to one another in the vertical direction on the rear side of the second gear accommodation portion 31c. The open sides of the first gear accommodation portion 31b, the second gear accommodation portion 31c, the lever accommodation portion 31d, and the pulley accommodation portions 31f, 31g face the center of the vehicle, and the open side of the substrate accommodation portion 31e faces the opposite direction, that is, the outside of the vehicle. As shown in FIG. 3, the first gear accommodation portion 31b, the second gear accommodation portion 31c, and the lever accommodation portion 31d sequentially communicate with one another such that parts of the circular cylindrical portions overlap, and the portions 31b, 31c, and 31d are arranged such that the centers of the circular cylindrical portions are arranged on a straight line. As shown in FIG. 4, a step D is provided between the bottom wall of the first and second gear accommodation portions 31b, 31c and the bottom wall of the lever accommodation portion 31d to provide an elevation difference. As shown in FIG. 5, the pulley accommodation portions 31*f*, 31*g* communicate with the second gear accommodation portion 31*c*.

As shown in FIG. 5, the motor holder portion 31*a* includes a holder main body 31*h* and a substantially cylindrical shaft insertion portion 31*i*. A stator 22*a* of the drive motor 22 is fastened to the holder main body 31*h* with screws B1. The shaft insertion portion 31*i* extends through the center portion of the holder main body 31*h* toward the center of the circular cylindrical portion of the first gear accommodation portion 31*b* and communicates with the first gear accommodation portion 31*b*. That is, the shaft insertion portion 31*i* is open approximately in the vertical direction of the vehicle, that is, in a direction substantially perpendicular to the opening direction of the first gear accommodation portion 31*b*. A rotary shaft 22*b* of the drive motor 22 having an axis extending along the shaft insertion portion 31*i* is inserted in the shaft insertion portion 31*i*, and a first small-diameter gear portion 41 secured to the rotary shaft 22*b* is accommodated in the shaft insertion portion 31*i* to be freely rotational. Thus, as shown in FIG. 4, the housing 31 (the case 30) is arranged inside the slide door 20 such that at least part of the housing 31 overlaps with a space having a dimension L in the lateral direction of the vehicle defined by the outer shape of the drive motor 22 (the stator 22*a*). The first small-diameter gear portion 41 is formed by, for example, a bevel gear.

A substantially columnar support portion 31*j* projects from the bottom wall center of the first gear accommodation portion 31*b*. The support portion 31*j* supports a transmission gear 42 to be freely rotational. That is, the transmission gear 42 includes a substantially columnar shaft portion 42*a*, which is coaxial with the support portion 31*j*, and a circular bearing portion 42*b*, which is formed in the distal end face of the shaft portion 42*a* opposite to the support portion 31*j* and is mounted to be freely rotational with respect to the support portion 31*j* via a sleeve 43. A circumferential groove 42*c* is formed in the outer circumferential surface of the shaft portion 42*a*. The circumferential groove 42*c* supports the rotary shaft 22*b* of the drive motor 22 to be freely rotational and to restrict the movement in the axial direction while permitting rotation of the transmission gear 42. The transmission gear 42 includes a disk-like first large-diameter gear portion 42*d*, which extends from the shaft portion 42*a* at a position further from the support portion 31*j* than the rotary shaft 22*b* in the axial direction. The first large-diameter gear portion 42*d* is formed of, for example, a bevel gear. The first large-diameter gear portion 42*d* has an outer diameter that is greater than the outer diameter of the first small-diameter gear portion 41 and meshes with the first small-diameter gear portion 41. The first large-diameter gear portion 42*d* and the first small-diameter gear portion 41 form a gear pair with intersecting axes (or face gear) G1. Therefore, when the rotary shaft 22*b* of the drive motor 22 is rotated, the rotational speed is reduced by the gear pair with intersecting axes G1 and transmitted to the gear 42. In this manner, the transmission gear 42 is integrally rotated with the drive motor 22. The transmission gear 42 includes a second small-diameter gear portion 42*e*, which is arranged on the opposite side of the first large-diameter gear portion 42*d* to the rotary shaft 22*b* in the axial direction of the transmission gear 42. The second small-diameter gear portion 42*e* has an outer diameter smaller than the outer diameter of the first large-diameter gear portion 42*d*. The transmission gear 42 also has a circular bearing portion 42*f*, which is formed in the distal end face of the second small-diameter gear portion 42*e*.

The second gear accommodation portion 31*c* has an inner diameter that is greater than the inner diameter of the first gear accommodation portion 31*b*. A substantially columnar support portion 31*k* projects from the bottom wall center of the second gear accommodation portion 31*c*. The support portion 31*k* supports a substantially columnar stepped support shaft 44, which is coaxial with the support portion 31*k*, to be freely rotational. That is, the support shaft 44 includes a circular bearing portion 44*a*, which is formed in the distal end face opposite to the support portion 31*k* and is mounted on the support portion 31*k* to be freely rotational via a sleeve 45, and a serration 44*b*, which is formed in the outer circumferential portion of the axial position corresponding to the bearing portion 44*a*. The support shaft 44 includes a large-diameter portion 44*c*, which is arranged adjacent to the serration 44*b* in the axial direction, a substantially elliptical fitting portion 44*d*, which is arranged adjacent to the large-diameter portion 44*c* in the axial direction, and a substantially columnar shaft portion 44*e*, which is arranged adjacent to the fitting portion 44*d* in the axial direction.

The drum 23 is coupled to the support shaft 44 to rotate integrally with the support shaft 44. That is, the substantially cylindrical drum 23 is open toward the first cover 32 and has a bottom wall on one axial end. A serration 23*a* formed in the inner circumferential surface of a bore that is formed through the bottom wall center portion engages with the serration 44*b*. A substantially cylindrical boss portion 23*b*, which has an inner diameter equal to the outer diameter of the large-diameter portion 44*c*, projects from the bottom wall center portion of the drum 23. The drum 23 has a circular accommodation space S inside the cylindrical outer circumferential wall.

A ring gear 46, which is coaxial with the drum 23, is supported on the drum 23 to be freely rotational. The ring gear 46 has an outer diameter smaller than the inner diameter of the cylindrical outer circumferential wall of the drum 23 and includes a cylindrical portion accommodated in the accommodation space S. A bottom wall is provided on one axial end of the cylindrical portion, and a circular bearing bore 46*a* is formed in the bottom wall center portion. The circular bearing bore 46*a* has an inner diameter that is equal to the outer diameter of the boss portion 23*b* and supports the boss portion 23*b*. Internal teeth 46*b* are formed on the inner circumferential surface of the cylindrical portion of the ring gear 46. The ring gear 46 also has an annular engaging section, which is a large gear 46*c* in this embodiment. The large gear 46*c* extends radially outward from the distal end of the cylindrical portion that projects from the accommodation space S and covers the open end face of the drum 23. A plurality of locking teeth 46*d*, which are substantially right-angled triangle, are arranged at equal angular intervals on the outer circumference portion of the large gear 46*c*. The inner diameter of the internal teeth 46*b* is greater than the outer diameter of the first large-diameter gear portion 42*d* of the transmission gear 42.

A carrier 47 is coupled to the support shaft 44, on which components such as the ring gear 46 are mounted, to rotate integrally with the support shaft 44. As shown in FIG. 5, the carrier 47 includes a pair of plates 51, 52 arranged next to each other in the axial direction of the support shaft 44, a pair of shaft portions 53 sandwiched between the opposing ends of the plates 51, 52, and a pair of planet gears 54, which are supported to be freely rotational about the shaft portions 53. A substantially elliptical fitting bore 51*a* is formed in the center portion of the first plate 51. The fitting bore 51*a* is fitted in the fitting portion 44*d* of the support shaft 44. A circular through hole 52*a* is formed in the center portion of the second plate 52. The shaft portion 44*e* is loosely inserted in the through hole 52*a*. Also, the planet gears 54 are accommodated in the ring gear 46 such that the planet gears 54 are meshed with the internal teeth 46*b* of the ring gear 46. The planet gears 54 can revolve in the ring gear 46 while rotating. Accordingly, the carrier 47 (the plates 51, 52) is rotational with respect to the ring gear 46 integrally with the drum 23 and the support shaft 44.

The support shaft 44, on which components such as the carrier 47 are mounted, further supports the sun gear 48 to be freely rotational. That is, the sun gear 48 integrally includes a sun gear portion 48a and a second large-diameter gear portion 48b. The sun gear portion 48a is loosely fitted in the through hole 52a, supports the shaft portion 44e, and is meshed with the planet gears 54. The second large-diameter gear portion 48b extends radially outward from the distal end of the sun gear portion 48a that projects from the through hole 52a and covers the open end face of the ring gear 46. The sun gear 48 (the sun gear portion 48a), the ring gear 46, and the carrier 47 form a planet gear mechanism G2. The outer diameter of the second large-diameter gear portion 48b is greater than the inner diameter of the internal teeth 46b of the ring gear 46 and meshes with the second small-diameter gear portion 42e such that the second large-diameter gear portion 48b covers the first large-diameter gear portion 42d of the transmission gear 42.

Therefore, when the transmission gear 42 is rotated, the rotational speed is reduced in accordance with the gear ratio of the second small-diameter gear portion 42e and the second large-diameter gear portion 48b and transmitted to the sun gear 48. Thus, the sun gear 48 rotates integrally with the transmission gear 42. Then, for example, when the sun gear 48 is rotated in a state in which the ring gear 46 is locked against rotation, the rotational speed is reduced by the speed reduction ratio in which the sun gear 48 (the sun gear portion 48a) serves as the drive shaft, the carrier 47 serves as the driven shaft, and the ring gear 46 serves as the fixed shaft, and the rotation is transmitted to the drum 23. That is, the rotational speed of the drive motor 22 (the rotary shaft 22b) is sufficiently reduced via, for example, the gear pair with intersecting axes G1 and the planet gear mechanism G2, and the rotation is transmitted to the drum 23. As the drum 23 is rotated, the slide door 20 is opened and closed in accordance with the rotation direction as described above.

The lever accommodation portion 31d includes a circular bearing bore 31l, which extends through the center of the sectorial bottom wall, a substantially rectangular guide groove 31m, which is arranged along the straight line connecting the bearing bore 31l and the support portion 31k and communicates with the second gear accommodation portion 31c, and a seat portion 31n, which bulges in a trapezoidal shape on the opposite side of the bearing bore 31l to the guide groove 31m. The bearing bore 31l supports a switching lever 56 (an input member) to be freely rotational. The switching lever 56 includes a substantially columnar stepped shaft portion 56a coaxial with the bearing bore 31l. The distal end portion of the shaft portion 56a is supported by the bearing bore 31l via a sleeve 57.

The switching lever 56 includes a sectorial lever portion 56b, which extends radially outward from the shaft portion 56a toward the large gear 46c at the axial position corresponding to the large gear 46c. An elongated hole-shaped cam hole 56c, which extends in the circumferential direction, is formed in the radially outward end portion of the lever portion 56b. The cam hole 56c includes a first end and a second end in the circumferential direction and is curved such that the second end is arranged closer to the shaft portion 56a than the first end in the radial direction. The first end is the leading end in the clockwise direction in FIG. 3.

Figure 6A:
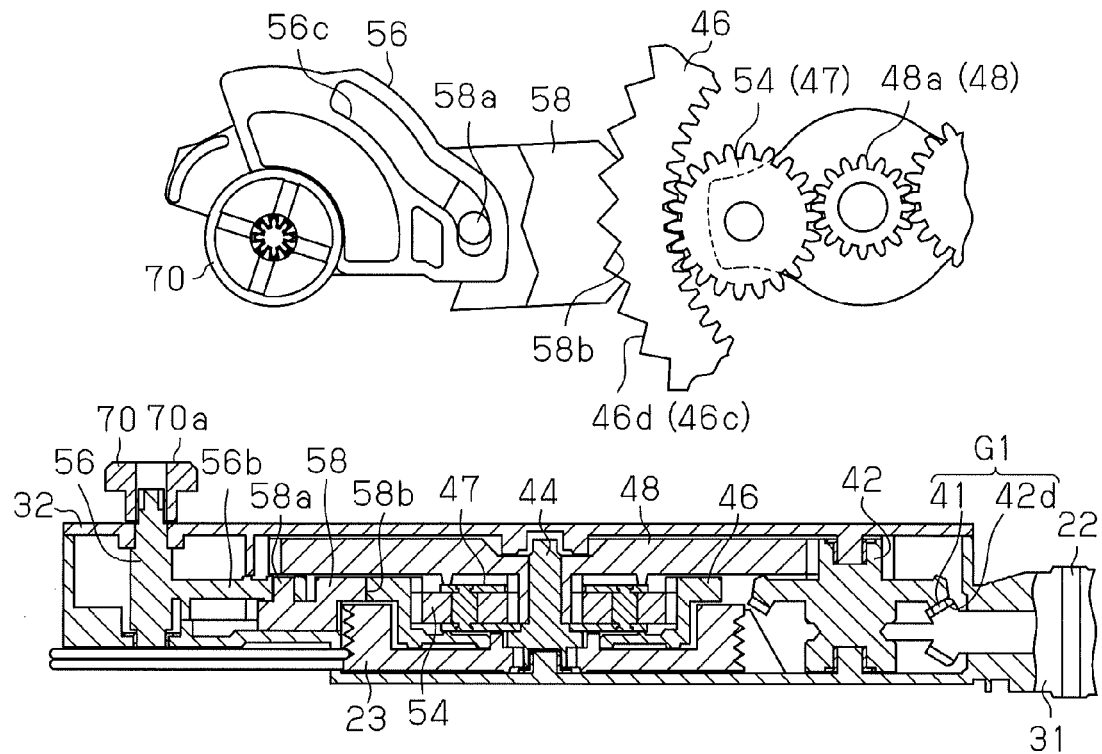
FIGS. 6(a) and 6(b) are diagrams showing operations of the ring gear and the engagement and disengagement block of the vehicle door driving apparatus in FIG. 1.
Figure 6B:
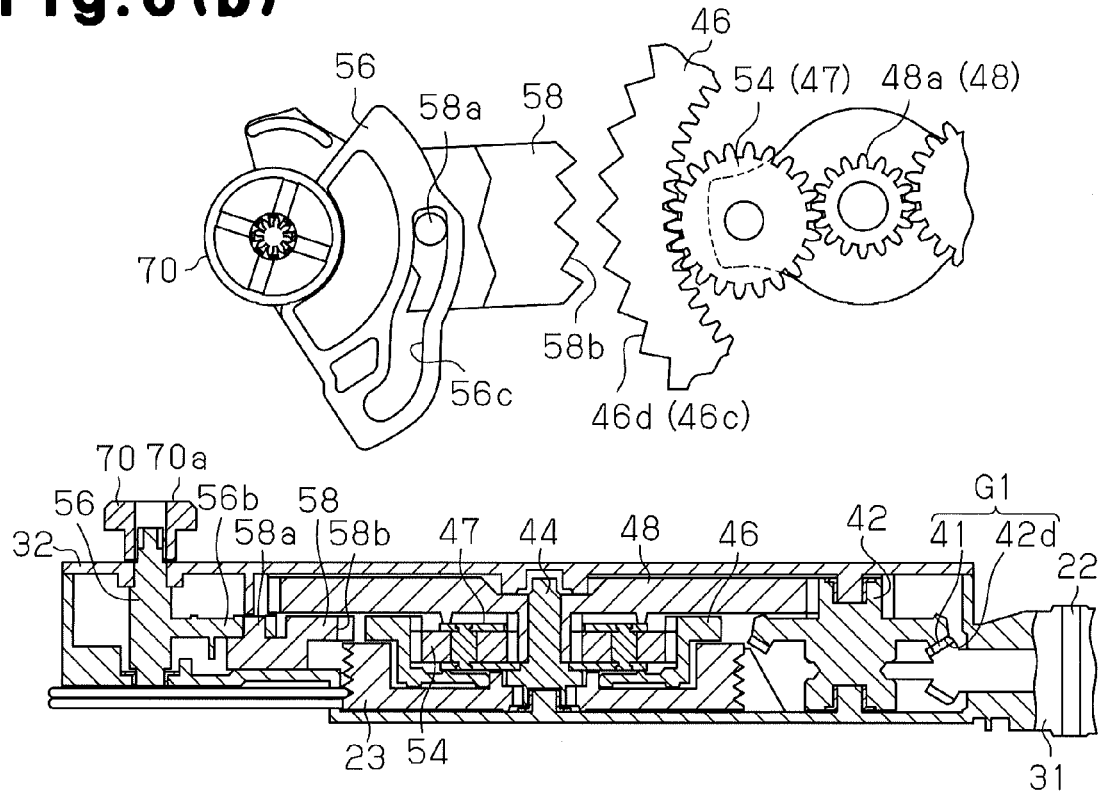

The switching lever 56 is rotational between an electric switching position Pa shown in FIG. 6(a) and a manual switching position Pm shown in FIG. 6(b). One end of an urging member, which is a restoring spring 63 (see FIG. 5) in this embodiment, is locked to the lever accommodation portion 31d. The other end of the restoring spring 63 is locked to the switching lever 56. The switching lever 56 is constantly urged toward the electric switching position Pa by the restoring spring 63.

An engagement and disengagement member, which is a plate-like engagement and disengagement block 58 in this embodiment, is fitted to the guide groove 31m. The engagement and disengagement block 58 is movable in its extending direction. The engagement and disengagement block 58 is formed in a crank shape and includes an engaging pin 58a, which is inserted in the cam hole 56c, and gear locking teeth 58b. The gear locking teeth 58b can be meshed with locking teeth 46d (the large gear 46c) facing the guide groove 31m. The gear locking teeth 58b are formed into a substantially right-angled triangle shape. As shown in FIG. 6(a), in a state where the switching lever 56 is arranged at the electric switching position Pa, the engaging pin 58a of the engagement and disengagement block 58 is arranged at the first end of the cam hole 56c. As the switching lever 56 is rotated toward the electric switching position Pa in the clockwise direction in FIG. 6(a), the engaging pin 58a is pressed by the inner wall surface of the cam hole 56c causing the engagement and disengagement block 58 to be pressed toward the second gear accommodation portion 31c. When the switching lever 56 moves to the electric switching position Pa, the gear locking teeth 58b mesh with the locking teeth 46d of the ring gear 46 and lock the ring gear 46 so that the ring gear 46 cannot rotate (rotation restricting state). When the switching lever 56 is arranged at the manual switching position Pm as shown in FIG. 6(b), the engaging pin 58a is arranged at the second end of the cam hole 56c. As the switching lever 56 is rotated toward the manual switching position Pm in the counterclockwise direction of FIG. 6(b), the engaging pin 58a is pressed against the inner wall surface of the cam hole 56c causing the engagement and disengagement block 58 to retract toward the shaft portion 56a, thus disengaging the gear locking teeth 58b and the locking teeth 46d to permit the rotation of the ring gear 46 (rotation permitting state). The large gear 46c, the switching lever 56, the engagement and disengagement block 58, and the restoring spring 63 form a switching section.

As shown in FIG. 5, the pulley accommodation portions 31f, 31g respectively support pulleys 65, 66 having different outer diameters to be freely rotational. The pulleys 65, 66 form the middle pulley 26. The cables 24, 25, which are wound and fed out by the drum 23, are respectively engaged around the pulleys 65, 66 and are guided by the pulleys 65, 66 to extend to the guide pulley 27 via a dust protective cable grommet 67.

As shown in FIG. 4, the first cover 32 is mounted on the housing 31, in which the components such as the transmission gear 42 are accommodated, to close the first gear accommodation portion 31b, the second gear accommodation portion 31c, the lever accommodation portion 31d, and the pulley accommodation portions 31f, 31g. The first cover 32 also supports the components such as the transmission gear 42, the support shaft 44, and the switching lever 56 to be freely rotational. That is, a substantially columnar support portion 32a projects from the lid wall of the first cover 32 and supports the bearing portion 42f via a sleeve 68. A substantially cylindrical bearing portion 32b projects from the lid wall of the first cover 32 and supports the shaft portion 44e via a sleeve 69. A substantially cylindrical bearing portion 32c projects from the lid wall of the first cover 32 and supports the shaft portion 56a, which extends through the lid wall.

A substantially button-shaped switching knob 70 is secured to the distal end portion of the shaft portion 56a to rotate integrally with the shaft portion 56a. The switching knob 70 is arranged such that the distal end face is exposed from the door trim 16 when the slide door 20 is closed, and a substantially cross-shaped keyway 70a is formed in the distal end face. Therefore, the position of the switching lever 56 can be switched between the electric switching position Pa and the manual switching position Pm by transmitting operating force from the passenger compartment side of the slide door 20 to the switching lever 56 via the switching knob 70. The switching knob 70, the switching lever 56, the engagement and disengagement block 58, and the restoring spring 63 form an engagement and disengagement section.

The components such as the transmission gear 42 accommodated in the housing 31 (the case 30) are arranged inside the slide door 20 to at least partially overlap the space having the dimension L in the lateral direction of the vehicle defined by the outer shape of the drive motor 22 (the stator 22a).

The general overview of operations of the present embodiment will now be described.

First, the switching lever 56 is arranged at the electric switching position Pa by manipulating the switching knob 70, and the engagement and disengagement block 58 locks the ring gear 46 against rotation as shown in FIG. 6(a). At this time, rotation of the drive motor 22 is subjected to a first stage speed reduction via the first small-diameter gear portion 41 and the first large-diameter gear portion 42d (the gear pair with intersecting axes G1), and the rotation is transmitted to the transmission gear 42. The rotational speed of the transmission gear 42 is further reduced via the second small-diameter gear portion 42e and the second large-diameter gear portion 48b, and the rotation is transmitted to the sun gear 48. The rotation of the sun gear 48 (the second large-diameter gear portion 48b) is subjected to a second stage speed reduction at the planet gear mechanism G2 by the speed reduction ratio in which the sun gear 48 (the sun gear portion 48a) serves as the drive shaft, the carrier 47 serves as the driven shaft, and the ring gear 46 serves as the fixed shaft, and the rotation is transmitted to the drum 23. Therefore, the rotational speed of the drive motor 22 is sufficiently reduced via, for example, the gear pair with intersecting axes G1 and the planet gear mechanism G2 before being transmitted to the drum 23.

In a case in which the slide door 20 is manually opened and closed in this state, even if the engagement and disengagement block 58 keeps locking the ring gear 46, the rotation of the drum 23 associated with opening and closing the slide door 20 is efficiently transmitted via, for example, the planet gear mechanism G2 and the gear pair with intersecting axes G1. Thus, the slide door 20 can be opened and closed by rotating, for example, the drive motor 22 (the rotary shaft 22b) with a certain manual operating force.

When the switching lever 56 is shifted to the manual switching position Pm by manipulating the switching knob 70, the engagement and disengagement block 58 releases the locking state of the ring gear 46 as shown in FIG. 6(b). In a case in which the slide door 20 is manually opened and closed in this state, rotation of the drum 23 (the carrier 47) associated with opening and closing the slide door 20 is permitted while allowing the ring gear 46 to spin free. In this manner, the slide door 20 can be opened and closed with slight operating force by disconnecting the rotation torque from the drum 23 and the drive torque from the rotary shaft 22b of the drive motor 22 using the engagement and disengagement block 58.

In the present embodiment, recesses and projections are formed to retain the switching lever 56 at the electric switching position Pa or the manual switching position Pm and to produce clicking sensation (notch sensation) during the switching operation. That is, as shown in FIGS. 5 and 7, a stepped surface 71, which faces the shaft portion 56a of the switching lever 56 and extends in the rotation direction of the switching lever 56, is provided on the seat portion 31n of the housing 31. The stepped surface 71 includes an electric switching engagement surface 71a and a manual switching engagement surface 71b. The engagement surfaces 71a, 71b are formed to bulge toward the shaft portion 56a and form a top portion at the center portion in the rotation direction of the switching lever 56. The switching lever 56 includes a sharp protrusion 72, which projects radially outward of the shaft portion 56a to face the stepped surface 71. As shown in FIG. 7(a), when the switching lever 56 is arranged at the electric switching position Pa, the protrusion 72 is arranged at the position over the top portion of the electric switching engagement surface 71a in a direction to separate from the manual switching engagement surface 71b. Also, as shown in FIG. 7(b), when the switching lever 56 is arranged at the manual switching position Pm, the protrusion 72 is arranged at the position over the top portion of the manual switching engagement surface 71b in a direction to separate from the electric switching engagement surface 71a.

Thus, for example, when switching the switching lever 56 from the manual switching position Pm to the electric switching position Pa, the protrusion 72 moves over the top portion of the manual switching engagement surface 71b, and further moves over the top portion of the electric switching engagement surface 71a in accordance with the rotation. This offers a crisp feel in the switching operation. Similarly, when the switching lever 56 is switched from the electric switching position Pa to the manual switching position Pm, the protrusion 72 moves over the top portion of the electric switching engagement surface 71a and further moves over the top portion of the manual switching engagement surface 71b in accordance with the rotation. This offers a crisp feel in the switching operation. The retaining force that retains the switching lever 56 at the electric switching position Pa depends on the urging force of the restoring spring 63, and the force required for the protrusion 72 to move over and past the top portion of the electric switching engagement surface 71a. The retaining force that retains the switching lever 56 at the manual switching position Pm depends on the force required for the protrusion 72 to move over and past the top portion of the manual switching engagement surface 71b. Also, the force required for the protrusion 72 to move over and past the top portion of the manual switching engagement surface 71b is set to be greater than the urging force of the restoring spring 63. Thus, the switching lever 56 is not switched from the manual switching position Pm to the electric switching position Pa only by the urging force of the restoring spring 63.

In a state in which the switching lever 56 is arranged at the electric switching position Pa and the engagement and disengagement block 58 locks the ring gear 46, if a load (torque) that exceeds a predetermined level is applied from the ring gear 46 to the engagement and disengagement block 58, the engagement and disengagement block 58 releases the ring gear 46 (cancellation mechanism) as shown in FIG. 8. That is, as exaggeratedly shown in FIG. 8, the first end of the cam hole 56c of the switching lever 56 forms an arcuate groove 73 about the shaft portion 56a. When the switching lever 56 is arranged at the electric switching position Pa, the engaging pin 58a is arranged at the circumferentially middle position of the arcuate groove 73. The locking teeth 46d of the ring gear 46 and the gear locking teeth 58b of the engagement and disengagement block 58 are both formed into a substantially right-angled triangle, and are meshed with each other. When the gear locking teeth 58*b* is pressed in the circumferential direction of the ring gear 46, the engagement and disengagement block 58 receives force in a direction to release the meshed state of the locking teeth 46*d* and the gear locking teeth 58*b*. Accordingly, the engagement and disengagement block 58 swings in the circumferential direction of the ring gear 46, and is further displaced toward the shaft portion 56*a* to separate from the locking teeth 46*d* while rotating the switching lever 56. More specifically, when the force that presses the engagement and disengagement block 58 back from the ring gear 46 is greater than the force that presses the engagement and disengagement block 58 against the ring gear 46 by the above-mentioned retaining force that retains the switching lever 56 at the electric switching position Pa (force that produces notch sensation of the switching lever 56 and the urging force of the restoring spring 63), the engagement and disengagement block 58 automatically unlocks the ring gear 46. The ring gear 46 is permitted to rotate (spin free) while interfering with the tips of the gear locking teeth 58*b*. As described above, even in the state in which the engagement and disengagement block 58 locks the ring gear 46, if a load that exceeds a predetermined level is transmitted between the ring gear 46 and the engagement and disengagement block 58, the engagement and disengagement block 58 unlocks the ring gear 46 so that the ring gear 46 becomes rotational. Thus, for example, even if load (torque) that exceeds a predetermined level is transmitted to the ring gear 46 via the drum 23 and the carrier 47 when opposite torque is input in emergency such as when premature opening operation is performed manually during electric closing operation of the slide door 20, load is prevented from being applied between the ring gear 46 and the engagement and disengagement block 58 (between the locking teeth 46*d* and the gear locking teeth 58*b*) excessively. In the state in which the cancellation mechanism is operated, the protrusion 72 has not moved over the top portion of the electric switching engagement surface 71*a* yet. Therefore, when the force that presses the engagement and disengagement block 58 back from the ring gear 46 is reduced, the above-mentioned relationship of force is reversed. That is, when the force that presses the engagement and disengagement block 58 against the ring gear 46 becomes greater than the force that presses the engagement and disengagement block 58 back from the ring gear 46, the engagement and disengagement block 58 is automatically locked to the ring gear 46 (relocked).

As shown in FIG. 5, a plate-like ECU (electronic control units) substrate 80, which is formed to match the outer shape of the lid wall, is accommodated in the substrate accommodation portion 31*e*. The ECU substrate 80 mounts an ECU 81 (see FIG. 9) mainly formed of a microcomputer and a rotation sensor 82, which is formed of, for example, a magnetism sensor including a hall element. The rotation sensor 82 detects, for example, the rotational position and the rotational speed of the drum 23. A ring-like magnet rotor 83 is secured to the drum 23 to rotate integrally with the drum 23. The rotation sensor 82 is arranged at a position separate from the magnet rotor 83 by a predetermined distance, and to face the magnet rotor 83. A bus bar (not shown) is embedded in the housing 31 to electrically connect the power supply portion of the drive motor 22 retained by the motor holder portion 31*a* to the ECU substrate 80. The drive motor 22 and the ECU substrate 80 (ECU 81) are electrically connected to each other basically without a wire harness.

The ECU substrate 80 (such as the ECU 81) accommodated in the housing 31 (the case 30) is arranged inside the slide door 20 to at least partially overlap the above-mentioned space having the dimension L in the lateral direction of the vehicle defined by the outer shape of the drive motor 22 (the stator 22*a*).

The electrical configuration of the present embodiment will further be described.

Figure 9:
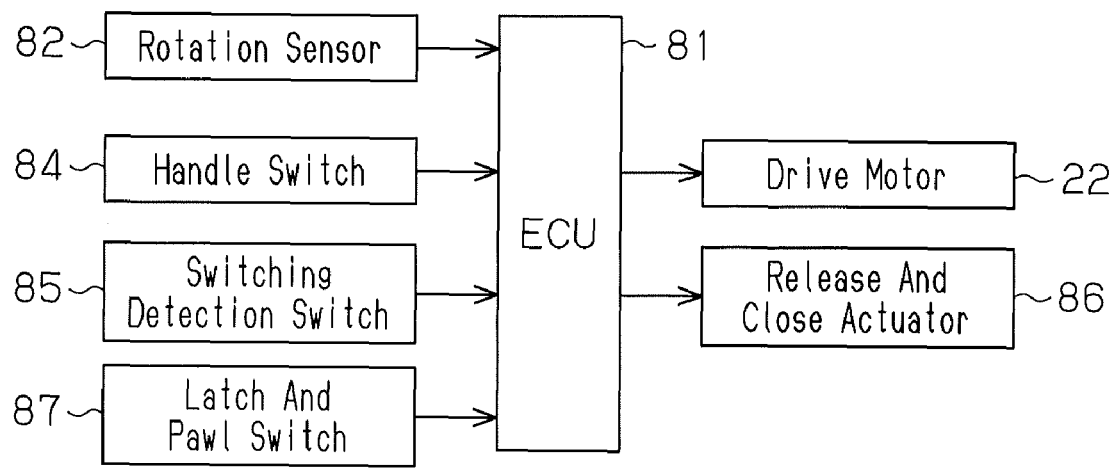
FIG. 9 is a block diagram illustrating the electrical configuration of the vehicle door driving apparatus of FIG. 1.

As shown in FIG. 9, the ECU 81 is electrically connected to the rotation sensor 82 and detects, for example, the rotational position and the rotational speed of the drum 23 (that is, the opening and closing position and the opening and closing speed of the slide door 20) based on detection signals from the rotation sensor 82. The ECU 81 is electrically connected to a handle switch 84 for obtaining information if there is an intention to open or close the slide door 20. The ECU 81 is electrically connected to a switching detection switch 85 for detecting the rotational position of the switching lever 56 (the electric switching position Pa or the manual switching position Pm) and detects the rotational position of the switching lever 56 based on the detection signals from the switching detection switch 85. The ECU 81 is electrically connected to the drive motor 22. The ECU 81 is electrically connected to a release and close actuator 86, which releases or engages a latch mechanism (not shown), which retains the slide door 20 at a fully closed state or a fully opened state. The ECU 81 is electrically connected to a latch and pawl switch 87 for obtaining retaining information of the slide door 20 associated with the operation of the latch mechanism. The latch mechanism is mechanically connected to a door handle (not shown) provided on the slide door 20 by a mechanical coupling member (not shown) such as a cable and can be released from the engaged state also by operation of the door handle. The ECU 81 controls the drive motor 22 based on the detection result of, for example, the rotation sensor 82.

That is, in a case in which the switching detection switch 85 detects that the switching lever 56 is located at the electric switching position Pa in the fully closed state of the slide door 20, and information that there is an intension to open the slide door 20 is detected as a user manipulates the handle switch 84, the ECU 81 drives the release and close actuator 86 to release the latch mechanism from retaining the fully closed state to permit the slide door 20 to open. Subsequently, the ECU 81 drives the drive motor 22 in the above-mentioned manner to open the slide door 20. Accordingly, the slide door 20 is electrically opened to a fully opened position. When the slide door 20 reaches the vicinity of the fully opened position and retained by the latch mechanism, the ECU 81 detects low rotation of the motor 22 within a specified range of the door position information obtained by the rotation sensor 82 (detects that the slide door 20 does not move further within the range of the specified fully opened position of the door) and stops operation of the motor 22.

Also, when the information that there is an intent to close the slide door 20 is detected as the user manipulates the handle switch 84 in the state in which the slide door 20 is fully opened, the ECU 81 drives the release and close actuator 86 to release the latch mechanism from retaining the fully opened state to permit the slide door 20 to be closed. Subsequently, the ECU 81 drives the drive motor 22 in the above-mentioned manner to close the slide door 20. Accordingly, the slide door 20 is electrically closed to move to the fully closed position. When the slide door 20 reaches the vicinity of fully closed position, and the latch and pawl switch 87 obtains the information that the slide door 20 is retained at the closed position, the ECU 81 stops the operation of the motor 22 and drives the release and close actuator 86 so that the latch mechanism retains the slide door 20 in the fully closed state.

Assume that, during electric opening and closing operation of the slide door 20, the slide door 20 has stopped at the middle between the opened position and the closed position due to manipulation by the user or power shortage. In this case, since the drive motor 22 and the drum 23 are coupled to rotate integrally, the weight of the slide door 20 causes the drive motor 22 to rotate when, for example, stopping on a slope, and the slide door 20 is opened or closed. Thus, the ECU 81 is set such that when the rotation sensor 82 detects rotation of the drum 23 while the drive motor 22 is stopped, the ECU 81 closes the motor power supply circuit and activates an electrical brake to stop the slide door 20.

In a case in which the switching detection switch 85 detects that the switching lever 56 is at the manual switching position Pm in the fully closed state of the slide door 20, and information that there is an intent to open the slide door 20 is detected as the user manipulates the handle switch 84, the ECU 81 drives the release and close actuator 86 to release the latch mechanism from retaining the fully closed state to permit the slide door 20 to open. However, the ECU 81 does not drive the drive motor 22 to open the slide door 20.

Also, when the information that there is an intent to close the slide door 20 is detected as the user manipulates the handle switch 84 in the state in which the slide door 20 is fully opened, the ECU 81 drives the release and close actuator 86 to release the latch mechanism from retaining the fully opened state to permit the slide door 20 to be closed. However, the ECU 81 does not drive the drive motor 22 to close the slide door 20.

Even if the information that there is an intent to open the slide door 20 is detected as the user manipulates the handle switch 84 while the slide door 20 is electrically or manually opened or closed, based on the retaining information of the slide door 20 obtained by the latch and pawl switch 87, the door position information obtained by the rotation sensor 82, and the power supply state to the motor 22, the ECU 81 determines that release operation and close operation of the release and close actuator 86 are unnecessary and does not perform the operation regardless of manipulation of the handle switch 84.

As described above, the present embodiment has the following advantages.

(1) In the present embodiment, the rotational speed of the drive motor 22 is sufficiently reduced via, for example, the gear pair with intersecting axes G1 and the planet gear mechanism G2 and transmitted to the drum 23. In this case, since the transmission efficiency in the rotation direction of the gear pair with intersecting axes G1 and the planet gear mechanism G2 associated with the speed reduction is greater than the transmission efficiency in the rotation direction of, for example, a worm gear, necessary torque is obtained with a small motor.

Also, when manually opening or closing the slide door 20, even if the ring gear 46 is switched to a rotation restricting state, the rotation of the drum 23 is efficiently transmitted by, for example, the planet gear mechanism G2 and the gear pair with intersecting axes G1, and the slide door 20 can be opened and closed while rotating, for example, the drive motor 22 (the rotary shaft 22b) with a certain operating force. Therefore, it is unnecessary to provide, for example, an electromagnetic clutch between the drive motor 22 and the drum 23 to selectively permit manual and electrical opening and closing operation of the slide door 20, and a switch for switching on and off the electromagnetic clutch is thus unnecessary. Accordingly, the number of components and the costs are reduced, and the size of the entire vehicle door driving apparatus is reduced.

Furthermore, speed reduction between the first small-diameter gear portion 41 and the first large-diameter gear portion 42d (the gear pair with intersecting axes G1) is performed at a position displaced in the axial direction of the transmission gear 42 with respect to the rotary shaft 22b of the drive motor 22. Also, the first large-diameter gear portion 42d (the gear pair with intersecting axes G1) and the sun gear portion 48a (the planet gear mechanism G2) are centrally arranged on the same side of the second small-diameter gear portion 42e and the second large-diameter gear portion 48b, which are associated with speed reduction, as the rotary shaft 22b in the axial direction of the transmission gear 42 and the sun gear 48, that is, in the space having the dimension L in the lateral direction of the vehicle defined by the outer shape of the drive motor 22. Therefore, the size of the transmission gear 42 and the sun gear 48 in the axial direction, that is, in the lateral direction of the vehicle (the door thickness direction) is prevented from being increased. In particular, since the components of the planet gear mechanism G2 are concentrated about the axis of the sun gear 48 except the second large-diameter gear portion 48b, which meshes with the transmission gear 42 (the second small-diameter gear portion 42e), a required speed reduction ratio is ensured while limiting the size of the planet gear mechanism G2 about the axis. Therefore, the size of the drive motor 22 is further reduced. Also, since the drum 23 is efficiently arranged such that at least part of the drum 23 overlaps the space having the dimension L in the lateral direction of the vehicle, the flexibility in arrangement in the slide door 20 is increased as a whole.

(2) In the present embodiment, the drum 23 accommodates the ring gear 46 radially inward to at least partially overlap the ring gear 46 in the axial direction of the ring gear 46. Thus, for example, as compared to a case in which the drum 23 and the ring gear 46 are stack on one another in the axial direction, the size of the drive mechanism 21 in the axial direction, that is, the lateral direction of the vehicle is limited.

(3) In the present embodiment, in the case in which the slide door 20 is manually opened or closed, when the ring gear 46 is switched to the rotation permitting state by, for example, the engagement and disengagement block 58, the drum 23 (the carrier 47) is permitted to rotate while the ring gear 46 spins free. By separating the rotation torque from the drum 23 and the drive torque from the rotary shaft 22b of the drive motor 22 using, for example, the engagement and disengagement block 58 as described above, the slide door 20 can be opened or closed with a small operating force. In particular, since the engagement and disengagement block 58 is efficiently arranged to at least partially overlap the space having the dimension L, the size of the drive mechanism 21 in the lateral direction of the vehicle (door thickness direction) is limited.

Although the ring gear 46 is switched to the rotation restricting state by, for example, the engagement and disengagement block 58, if load (torque) that exceeds a predetermined level is transmitted to the ring gear 46 via the drum 23 and the carrier 47 associated with opening and closing operation of the slide door 20, rotation restricting state of the ring gear 46 by the engagement and disengagement block 58 is cancelled. Thus, the ring gear 46 or the engagement and disengagement block 58 is prevented from receiving excessive load (torque). In particular, since the locking teeth 46d and the gear locking teeth 58b are substantially right-angled triangles that are symmetrical, excessive load (torque) is prevented from being applied to the ring gear 46 or the engagement and disengagement block 58 regardless of the direction of load (torque) transmitted by the ring gear 46, that is, regardless of the opening and closing direction and the opening and closing position of the slide door 20.

(4) In the present embodiment, the drive mechanism 21 is formed as a unit by integrally accommodating, for example, the drum 23, the transmission gear 42, the ring gear 46, the carrier 47, the sun gear 48, the switching lever 56 and the engagement and disengagement block 58, which form the cancellation mechanism, the middle pulley 26, and the ECU substrate 80 in the case 30. Therefore, mounting performance of the drive mechanism 21 to the slide door 20 is improved. Also, since the components such as the drum 23 are centrally arranged in the case 30, the size of the drive mechanism 21 as a whole is reduced.

(5) In the present embodiment, the linear motion of the engagement and disengagement block 58 associated with the engagement with and disengagement from the large gear 46c of the ring gear 46 (the movement of the ring gear 46 in the radial direction) is achieved with a very simple structure by converting the rotation of the switching lever 56 (and the switching knob 70) linked to the engagement and disengagement block 58. When the switching knob 70 is released, the switching lever 56 is urged by the restoring spring 63 and is restored to and retained at the rotational position at which the engagement and disengagement block 58 and the large gear 46c are engaged.

(6) In the present embodiment, in the state in which the drive motor 22 and the drum 23 are coupled to rotate integrally with each other, if the slide door 20 starts to open or close by its own weight while, for example, stopping on a slope, the motor power supply circuit is closed to activate the electrical brake so that the slide door 20 is stopped. Therefore, it is unnecessary to provide an electromagnetic clutch that functions as a brake (frictional brake) to prevent such opening and closing operation of the slide door 20.

(7) In the present embodiment, since switching of the switching lever 56 between the electric switching position Pa and the manual switching position Pm is permitted only by using an appropriate key (such as a coin) that can be engaged with the keyway 70a of the switching knob 70, the switching lever 56 is prevented from being carelessly switched by, for example, a child.

(8) In the present embodiment, during electric or manual opening and closing operation of the slide door 20, even if the information that there is an intension to open the slide door 20 according to manipulation of the handle switch 84 by the user, the ECU 81 does not perform unnecessary operation of the release and close actuator 86 (releasing operation or closing operation) regardless of manipulation of the handle switch 84, based on the retaining information of the slide door 20 obtained by the latch and pawl switch 87, the door position information obtained by the rotation sensor 82, and the power supply state to the motor 22. In this manner, unnecessary electric operation of the release and close actuator 86 is prevented, and, for example, an uncomfortable feeling caused by the operational noise is eliminated.

(9) In the present embodiment, electric or manual switching is performed by the drive mechanism 21 (such as the switching knob 70) mounted on the slide door 20. Thus, for example, in a case in which the drive mechanism 21 is mounted on each slide door 20 arranged on each side of the vehicle in the lateral direction of the vehicle, the electric or manual operation can be independently selected for each slide door 20. Thus, for example, as compared to a case in which the electric or manual operation of the slide doors 20 is selected uniformly by manipulating a single main switch provided near the driver's seat, freedom of usage is improved. Also, by omitting such a main switch, the electrical configuration is simplified, and the costs are reduced.

(10) In the present embodiment, except the drive motor 22, the drive mechanism 21 can be assembled by sequentially mounting the components such as the transmission gear 42 in the opening portion on one side of the housing 31, then closing the opening with the first cover 32, and likewise, sequentially mounting the ECU substrate 80 in the opening portion on the other side of the housing 31 and then closing the opening with the second cover 33. Therefore, manufacturing steps are simplified by mounting in one direction.

(11) In the present embodiment, since the switching lever 56 can transmit operating force from the side of the slide door 20 in the passenger compartment via the keyway 70a of the switching knob 70, the switching lever 56 is prevented from being manipulated by, for example, tampering of children. In particular, for example, by arranging the switching knob 70 to be hidden when the slide door 20 is fully opened such that the occupant in the passenger compartment can manipulate the switching knob 70 only when the slide door 20 is closed, the switching state immediately before the manipulation to open the slide door 20 is basically maintained until the slide door 20 is closed. The convenience is improved by matching the usage manner such that when the slide door 20 is electrically opened, it is electrically closed, and when manually opened, it is manually closed. Also, in a case in which the slide door 20 is mounted on both sides of the lateral direction of the vehicle, the freedom of usage manner is improved since electric or manual operation can be selected for each slide door 20. Furthermore, since the switching knob 70 is basically manipulated by the occupant who manipulates the slide door 20, confusion in the usage manner is avoided caused when the switching knob 70 is manipulated by anyone other than the occupant who manipulates the slide door 20 such as the driver.

The above described embodiment may be modified as follows.

Figure 10:
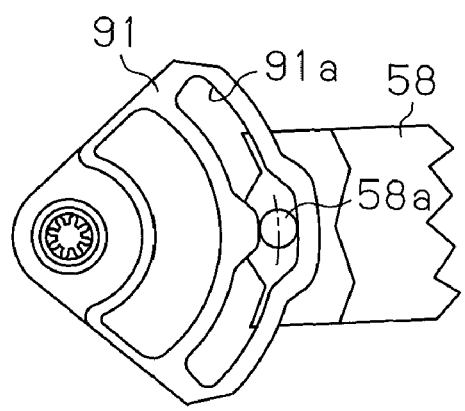
FIG. 10 is a front view illustrating a switching lever according to a modification of the present invention.

As shown in FIG. 10, a switching lever 91 may be employed that has a symmetrical cam hole 91a. When the engagement and disengagement block 58 locks the ring gear 46, the engaging pin 58a is arranged at the circumferential center portion of the cam hole 91a. In this case, the restoring spring 63 (see FIG. 5), which urges the switching lever 91 preferably retains the switching lever 91 such that the engaging pin 58a is arranged at the circumferential center portion. Also, in this state, locking of the ring gear 46 by the engagement and disengagement block 58 can be released by rotating the switching lever 91 in either direction. Therefore, two positions may be set as the manual switching position Pm of the switching lever 91.

The first small-diameter gear portion 41 may be a flat gear. Also, a straight bevel gear, a spiral bevel gear, or a zerol bevel gear may be employed as the gear pair with intersecting axes.

The axis of the transmission gear 42 (the first large-diameter gear portion 42d) does not necessarily need to intersect the axis of the first small-diameter gear portion 41. That is, the first small-diameter gear portion 41 and the first large-diameter gear portion 42d may constitute a hypoid gear (face gear) whose axis does not intersect with the axis of the meshing gear.

If the extending direction of the cables 24, 25 that are wound and fed out by the drum 23 matches the direction in which the guide pulley 27 is arranged, the middle pulley 26 may be omitted.

In a state in which the drive motor 22 and the drum 23 are coupled to rotate integrally with each other, a drive motor may be employed that includes a mechanical clutch on the rotary shaft to prevent opening and closing of the slide door 20 by its own weight such as when stopping on a slope. In this case, a small clutch will be sufficient since rotation by the reverse input torque can be restricted with a small torque before speed reduction.

The switching section (such as the switching lever 56) may be electrically operated.

The switching section (such as the switching lever 56) may be omitted, and the slide door 20 may basically be opened and closed only electrically. In this case, the fixed shaft, which is the ring gear 46 in this embodiment, may be mounted on the housing 31 not to rotate. Also, since the opening and closing position of the slide door 20 correlates with the rotational position of the rotary shaft 22b of the drive motor 22, the rotational position of the rotary shaft 22b may be detected by the rotation sensor 82.

The drive mechanism 21 may be secured to the vehicle body 10. For example, when mounting the drive mechanism 21 on the quarter panel 10b, the tensioners 28, 29 are preferably connected to the drive mechanism 21. Also, in a case in which the drive mechanism 21 is mounted in a step that serves as a stool at the door opening 10a, a belt pulley, which serves as the drum, and a belt, which serves as the rope member, are preferably employed.

DESCRIPTION OF THE REFERENCE NUMERALS

G1 ... gear pair with intersecting axes, G2 ... planet gear mechanism, 10 ... vehicle body, 10a ... door opening, 20 ... slide door (vehicle door), 21 ... drive mechanism, 22 ... drive motor (motor), 22a ... stator, 22b ... rotary shaft, 23 ... drum, 24 ... first cable (rope member), 25 ... second cable (rope member), 26 ... middle pulley (pulley mechanism), 30 ... case, 31 ... housing, 32 ... first cover, 33 ... second cover, 41 ... first small-diameter gear portion, 42 ... transmission gear, 42d ... first large-diameter gear portion, 42e ... second small-diameter gear portion, 46 ... ring gear, 46c ... large gear (engaging section, switching section), 46d ... locking teeth (cancellation mechanism), 47 ... carrier, 48 ... sun gear, 48a ... sun gear portion, 48b ... second large-diameter gear portion, 54 ... planet gear, 56, 91 ... switching lever (input member, switching section), 56c, 91a ... cam hole, 58 ... engagement and disengagement block (engagement and disengagement member, switching section), 58b ... gear locking teeth (cancellation mechanism), 63 ... restoring spring (urging member, switching section), 70 ... switching knob, 73 ... groove (cancellation mechanism).

The invention claimed is:
1. A vehicle door driving apparatus, comprising:
a drive mechanism secured inside a vehicle door, wherein the drive mechanism opens and closes a door opening formed in a vehicle body, the drive mechanism including a motor and a drum, wherein the drum is rotated by the motor; and
a rope member wound about the drum and coupled to the vehicle body,
wherein the vehicle door is opened and closed as rotation of the drum is converted to force applied to the vehicle body via the rope member,
wherein the drum is arranged inside the vehicle door such that the drum at least partially overlaps with a space having a dimension in the lateral direction of the vehicle defined by an outer shape of the motor,
the drive mechanism including:
a first small-diameter gear portion coupled to a rotary shaft of the motor to rotate integrally with the rotary shaft;
a transmission gear, which is freely rotational about an axis extending in the lateral direction of the vehicle, the transmission gear including a first large-diameter gear portion, which is meshed with the first small-diameter gear portion and forms a gear pair with intersecting axes or a hypoid gear together with the first small-diameter gear portion, and a second small-diameter gear portion, which is arranged on an opposite side of the first large-diameter gear portion in the axial direction of the transmission gear;
a sun gear, which is freely rotational about an axis extending in the lateral direction of the vehicle, the sun gear including a second large-diameter gear portion, which is meshed with the second small-diameter gear portion, and a sun gear portion, which is arranged on the same side of the second large-diameter gear portion as the rotary shaft;
a ring gear arranged coaxially with the sun gear and radially outward of the sun gear portion, the ring gear serving as a fixed shaft; and
a carrier including a planet gear meshed with the sun gear portion and the ring gear, and the carrier being coupled to the drum to rotate integrally with the drum.

2. The vehicle door driving apparatus according to claim 1, wherein the drum is arranged to be coaxial with the ring gear, and the drum accommodates the ring gear such that the drum at least partially overlaps the ring gear in the axial direction of the ring gear.

3. The vehicle door driving apparatus according to claim 1, comprising:
a switching section arranged to at least partially overlap the space having the dimension in the lateral direction of the vehicle defined by the outer shape of the motor, the switching section switches between a restricting state and a permitting state of rotation of the ring gear; and
a cancellation mechanism, wherein, in a state in which the ring gear is switched to the restricting state of rotation by the switching section, the cancellation mechanism cancels the restricting state, which is brought about by the switching section, by transmitting a load that exceeds a predetermined level to the ring gear via the drum and the carrier associated with opening and closing operation of the vehicle door.

4. The vehicle door driving apparatus according to claim 3, comprising a pulley mechanism around which the rope member that is wound and fed out by the drum is engaged, and the pulley mechanism guides the rope member to be coupled to the vehicle body, wherein the drive mechanism includes a case, which integrally accommodates the drum, the transmission gear, the sun gear, the ring gear, the carrier, the switching section, the cancellation mechanism, and the pulley mechanism.

5. The vehicle door driving apparatus according to claim 3, wherein the switching section includes:
an engaging section formed on the outer circumferential surface of the ring gear;
an engagement and disengagement member provided to face the engaging section and to be movable in the radial direction of the ring gear, the engagement and disengagement member restricts rotation of the ring gear by engaging with the engaging section;
an input member, which is linked to the engagement and disengagement member, the input member switches between an engaging state and a disengaging state of the engagement and disengagement member with respect to the engaging section in accordance with rotation; and an urging member, which urges the input member to a rotation position at which the engagement and disengagement member engages with the engaging section.

* * * * *